(12) United States Patent
Geldmacher

(10) Patent No.: US 8,972,078 B2
(45) Date of Patent: Mar. 3, 2015

(54) MOBILE IDENTIFICATION TRANSMITTER WHICH CAN BE SET TO A NORMAL STATE AND A SECURE STATE

(75) Inventor: Alexander Geldmacher, Wuppertal (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 0 days.

(21) Appl. No.: 13/541,112

(22) Filed: Jul. 3, 2012

(65) Prior Publication Data

US 2013/0013128 A1 Jan. 10, 2013

(30) Foreign Application Priority Data

Jul. 5, 2011 (DE) .......................... 10 2011 051 586

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| B60R 25/24 | (2013.01) | |
| G07C 9/00 | (2006.01) | |

(52) U.S. Cl.
CPC ............ B60R 25/24 (2013.01); G07C 9/00944 (2013.01)
USPC ...... 701/2; 701/1; 701/36; 701/491; 701/526; 340/5.52; 340/5.61; 340/5.81; 340/5.82

(58) Field of Classification Search
CPC . G06Q 10/0833; G06Q 10/087; G06Q 10/10; G06Q 50/02; B60R 21/0152; B60R 25/102; B60R 25/305; B60R 21/01536; G06K 19/07749; G06K 19/073; G06K 7/10366; G06K 9/00624

USPC ............ 235/380, 492, 439; 340/5.64, 426.13, 340/426.1, 5.72, 425.5, 5.61, 5.52, 5.8, 5.7, 340/10.5, 5.71, 5.84, 5.81, 5.82; 701/1, 2, 701/236, 45, 469, 537, 538

See application file for complete search history.

(56) References Cited

U.S. PATENT DOCUMENTS

| | | | | |
|---|---|---|---|---|
| 6,771,981 | B1 * | 8/2004 | Zalewski et al. .............. | 455/557 |
| 7,204,425 | B2 * | 4/2007 | Mosher et al. ................ | 235/492 |
| 8,078,885 | B2 * | 12/2011 | Jobmann ....................... | 713/186 |
| 8,106,747 | B2 * | 1/2012 | Nguyen ....................... | 340/10.1 |

(Continued)

FOREIGN PATENT DOCUMENTS

| | | |
|---|---|---|
| DE | 102008037717 A1 | 12/2009 |
| DE | 102009057060 A1 | 6/2011 |

(Continued)

*Primary Examiner* — Calvin Cheung
*Assistant Examiner* — Luis A Martinez Borrero
(74) *Attorney, Agent, or Firm* — Cantor Colburn LLP

(57) ABSTRACT

A mobile identification transmitter for activating a security system of a motor vehicle, particularly an access and/or ignition control system, having a housing in which electronics and a communication means are arranged, wherein the communication means can be brought into communication with a communication means of the security system on board the motor vehicle, a payment element is removably fastened in a receptacle of the housing, where a closure is separately arranged on the housing, the identification transmitter can be set in a normal state and in a secure state, in the normal state and in the secure state communication can be made with the security system, in the secure state the payment element is removed from the receptacle, and the closure seals and protects the receptacle.

18 Claims, 2 Drawing Sheets

(56) References Cited

U.S. PATENT DOCUMENTS

| | | |
|---|---|---|
| 8,195,106 B2 * | 6/2012 | Jung et al. ............... 455/126 |
| 2003/0146821 A1 | 8/2003 | Brandt |
| 2004/0104268 A1 * | 6/2004 | Bailey ..................... 235/439 |
| 2005/0017068 A1 * | 1/2005 | Zalewski et al. ......... 235/380 |
| 2005/0068159 A1 * | 3/2005 | Hung ..................... 340/426.13 |
| 2005/0128053 A1 * | 6/2005 | Bareither et al. ......... 340/5.64 |
| 2005/0273218 A1 * | 12/2005 | Breed et al. ............. 701/2 |
| 2006/0201432 A1 * | 9/2006 | Pratt ..................... 119/51.02 |
| 2006/0219776 A1 * | 10/2006 | Finn ..................... 235/380 |
| 2007/0018787 A1 * | 1/2007 | Martinez de Velasco Cortina et al. ..................... 340/5.61 |
| 2007/0194133 A1 * | 8/2007 | Mimura ..................... 235/492 |
| 2008/0186138 A1 * | 8/2008 | Butler et al. ............. 340/10.1 |
| 2008/0204237 A1 * | 8/2008 | Levin ..................... 340/572.1 |
| 2009/0171851 A1 * | 7/2009 | Beenau et al. ............. 705/72 |
| 2009/0254572 A1 * | 10/2009 | Redlich et al. ............. 707/10 |
| 2009/0289776 A1 * | 11/2009 | Moore et al. ............. 340/10.41 |
| 2010/0134257 A1 * | 6/2010 | Puleston et al. ............. 340/10.4 |
| 2010/0214083 A1 * | 8/2010 | McNay ..................... 340/426.1 |
| 2010/0250497 A1 * | 9/2010 | Redlich et al. ............. 707/661 |
| 2011/0148574 A1 * | 6/2011 | Simon et al. ............. 340/5.61 |
| 2011/0287808 A1 * | 11/2011 | Huang ..................... 455/557 |
| 2011/0309912 A1 * | 12/2011 | Muller ..................... 340/5.72 |
| 2011/0316680 A1 * | 12/2011 | Heininger ............. 340/425.5 |
| 2012/0019363 A1 * | 1/2012 | Fein ..................... 340/10.1 |
| 2012/0151977 A1 | 6/2012 | Holowin et al. |
| 2012/0254948 A1 * | 10/2012 | Kleve et al. ............. 726/4 |

FOREIGN PATENT DOCUMENTS

| | | |
|---|---|---|
| EP | 2412586 A1 | 2/2012 |
| EP | 2450242 A1 | 5/2012 |

\* cited by examiner

MOBILE IDENTIFICATION TRANSMITTER WHICH CAN BE SET TO A NORMAL STATE AND A SECURE STATE

TECHNICAL FIELD

The invention relates to a mobile identification transmitter for the purpose of activating a security system of a motor vehicle, particularly an access and/or ignition control system, having a housing in which electronics and a communication means are arranged, wherein the communication means can be brought into communication with a communication means of the security system located on board the motor vehicle.

BRIEF DESCRIPTION OF RELATED ART

DE 10 2010 061 331.2 discloses a keyless security system of a motor vehicle. In this case, the authorized user can actively operate the mobile identification transmitter in order to transmit a signal to the base station, for example a receiver unit included in the motor vehicle, to unlock/lock the motor vehicle.

The identification data contained in the data unit can also be regenerated in known access control procedures. In addition, electronic locking systems for motor vehicles are currently expanding in the market, and are equipped with both the functionality described above, requiring manual operation, and also a functionality which does not require manual operation, the so-called "Keyless-Go" or "Keyless Entry" functionality. In contrast to the conventional remote control, the keyless entry functionality does not require operation of the identification transmitter to unlock/lock a motor vehicle door or the motor vehicle trunk, or other components of the motor vehicle. Rather, upon operation of the door handle on the automobile door, communication is initiated between the motor vehicle and the identification transmitter, and the electrical door opening, trunk opening, etc. of the motor vehicle is activated upon a positive authentication. This means that the user carrying a valid identification transmitter can unlock and/or lock his motor vehicle without needing to actively operate the identification transmitter. For example, an access control method is known wherein a transmission pulse is transmitted via an inductive antenna to the identification transmitter upon the operation of the door handle. The identification transmitter is then awakened as a result and transmits a radio signal to the transmitter/receiver unit on board the motor vehicle, which then relays this signal from the control unit for the access authorization. If the correct code is recognized at this point, then the electrical door unlock is activated. The same process can play out in a door locking procedure as a result of the door handle being touched.

BRIEF SUMMARY

The problem addressed by the present invention is that of creating a mobile identification transmitter for a keyless activation of a security system of a motor vehicle which possesses an enlarged functionality and has a simple design, wherein at the same time the user is provided with a comfortable mobile identification transmitter.

According to the invention, for this purpose a payment element is removably fastened in a receptacle of the housing, a closure is separately arranged on the housing, the identification transmitter can be set in a normal state and in a secure state, in the normal and in the secure state it is possible to execute a communication with the security system, in the secure state the payment element of the receptacle is removed, and the closure protects and seals the receptacle.

The payment element can be removed from the housing of the identification transmitter by the user if necessary. This is the case, for example, if the motor vehicle having the identification transmitter is brought to a repair shop, or a third person receives the mobile identification transmitter in order to, for example, park the motor vehicle, etc. By means of the payment element which is removably fastened in the receptacle of the housing, the user can carry out various payment actions, for example at a gas station, in a shopping center, etc. During the payment process, the payment element preferably remains inside the housing. In order to rule out the risk of an unauthorized person carrying out a payment function using the mobile identification transmitter, the authorized user can remove the payment element from the housing at any time, wherein all additional functions of the mobile identification transmitter, particularly the keyless activation of the security system of the motor vehicle, remain preserved. This means that both in the identification transmitter normal state and secure state, it is possible to carry out communication with the security system. However, if the mobile identification transmitter is in the secure state, a payment action is blocked because the payment element is no longer located in the receptacle of the housing of the identification transmitter. In order to ensure the functionality of the identification transmitter according to the invention, it is necessary that, particularly in the secure state, the receptacle in which the payment element is normally located is effectively sealed. Particularly in the event that moisture, dirt particles, etc. penetrate the receptacle from the outside, for the normal state of the identification transmitter it has been shown that the electrical connection between the payment element and the electronics integrated inside the housing can be disadvantageously disturbed, whereby payment actions are disadvantageously no longer possible via the payment element. The closure according to the invention effectively prevents any disruptions to the connection between the payment element and the electronics of the identification transmitter arranged therein, and/or prevents the occurrence of any communication disruptions between the payment element and the electronic payment system. In addition, the sealing closure prevents moisture, dirt particles, etc. from being able to penetrate into the interior of the housing when the identification transmitter is in the secure state, whereby the electronics responsible for communication with the security system on board the vehicle would also be damaged.

In a further measure which improves the invention, in the normal state the payment element can be brought into data communication with a payment system, and the payment element particularly has a credit card function and/or a debit card function.

The payment element can have a microprocessor, wherein the payment element can communicate with the payment system, and particularly can execute remote financial transactions such as loading a certain amount of money onto the payment element or debiting a defined amount from the payment element. For example, the payment element can be provided only for small sums, particularly as a payment means for paying small daily costs, whereby in this manner an insert for the use of small amounts of electronic cash is offered. In addition, the payment element can be equipped in such a manner that amounts can be transferred in communication with the payment system without any limit.

The payment element is advantageously designed having a storage device, wherein the payment element can be designed in an additional embodiment of the invention as having an integrated circuit which can have one or multiple microprocessors. In this case, the microprocessors and the storage device play an important role in one possible embodiment of the invention with regard to security, because the storage device can contain codes, for example, for the authorization, for control, for new balances, etc. In one possible embodiment of the invention, the microprocessor can be disposed to carry out complex calculation algorithms or to evaluate a secret value from the identification data input into the microprocessor.

After the payment element is brought into data communication with the electronic payment system, in one embodiment of the invention the payment element can remain nonfunctioning if the calculated secret code is not equal to a secret code already located in the card.

The receptacle advantageously has contact elements, wherein the payment element in the normal state contacts and is connected to said contact elements, wherein in the secure state the closure protects the contact elements from the external environment. In the normal state of the mobile identification transmitter, the payment element, particularly having its own on-board contact elements, directly abuts the contact elements on the receptacle. In addition, in the configuration the payment element as such likewise has a reliable sealing function, such that in the normal state of the identification transmitter, likewise no moisture, dirt particles, etc. can penetrate into the receptacle and/or into the housing. The contact elements of the receptacle are sealed and protected in the secure state of the identification transmitter via the closure, and in the normal state of the identification transmitter via the payment element.

Similarly, a carrier can be included, wherein the payment element is integrated into said carrier, and the carrier is removably fastened in the receptacle. In the normal state of the identification transmitter, the carrier is inserted in the receptacle of the housing, wherein for the user the carrier can constitute, at least in a section thereof, a component of the housing. The carrier is advantageously matched to the corresponding geometry of the receptacle of the housing, such that the carrier is reliably held in the receptacle of the housing. The carrier can, for example, be fastened on the housing, particularly on the receptacle of the housing, in a positive-fitting and/or force-fitting manner.

The closure can advantageously be movably mounted on the housing, and can move between an active position and a passive position, wherein the identification transmitter is in the active position when in the secure state. In the passive position of the closure, the payment element is located in the receptacle of the housing such that payment actions can be initiated by the user.

In addition, a configuration can be contemplated wherein via a corresponding, intentional activation of the identification transmitter, particularly of an activation element, the payment element and/or the carrier can be removed from the receptacle of the housing by the user. This means that in the normal state of the identification transmitter, the payment element is located in the receptacle of the housing and is secured in that location in such a manner that any removal thereof from the receptacle is blocked. This can be realized, for example, via locking elements which act directly on the payment element and/or on the carrier. Only once the user consciously initiates an activation of the identification transmitter will the blocking of the payment element and/or of the carrier in the receptacle be lifted, such that the user can then remove the payment element from the receptacle.

A configuration can likewise be contemplated wherein an energy storage device is included which supplies the electronics and/or the payment element with current. As such, it is possible to include only one energy storage device in the identification transmitter which supplies the electronics inside the housing with current, and also makes a payment action via the payment element possible. Likewise, a second energy storage device can be contained in the mobile identification transmitter as a redundancy. In addition, the one energy storage device can likewise recharge the additional energy storage device in the event that a discharge of energy and/or energy consumption has occurred. The first and/or the second energy storage device can be designed as a battery, an accumulator, a magnetic energy storage device, or as a capacitor.

In addition, the closure can be designed as a dummy plug which is particularly fastened to a cable of the housing. In this case, the cable can be flexible and/or elastic, wherein the cable functions as a security element such that the closure does not release from the identification transmitter and therefore becomes lost. The advantage of designing the closure as a dummy plug is that a reliable hold is ensured in the receptacle via the plug function, wherein the receptacle has a corresponding fastening means with which the dummy plug can engage.

A configuration can likewise be contemplated wherein the carrier and/or the payment element has its own communication means for communication with the payment system. This means that an independent, second communication means is used on board the identification transmitter for the keyless activation of the security system of the motor vehicle, and the same is located on the carrier and/or on the payment element.

Similarly, the communication means of the identification transmitter can simultaneously serve the purpose of communication with the payment system.

It is particularly advantageous that a cashless payment transaction can take place at a point of sale (POS) by means of the removable payment element, wherein it is possible to execute an electronic debit, wherein the same can take place as an online process or as an offline process, for example. In the case of the online process, the electronic payment system is connected to a card operator, for example Maestro, VISA, etc., with or without the support of a computer. In this case, the payment element is checked for misuse by utilizing numbers and a PIN, and then the debiting of the customer's account can be performed by a corresponding transaction between the card operator and the customer's bank. Likewise, it can be contemplated that the electronic debit process is carried out in an offline process, wherein only the account data is used during the payment action. For the purpose of obtaining permission for the charge, particularly for the debiting procedure, the seller, agent, etc. obtains permission for the charge by receiving a signature from the customer on the receipt, wherein said customer carries the identification transmitter according to the invention with him or her.

In order to increase the security of the communication between the payment element and the payment system, the communication means of the payment element advantageously has a range of less than 20 cm, particularly less than 10 cm. The payment element and the electric payment system advantageously communicate with each other cryptographically. Likewise, the communication means of the payment element can work in a frequency range of approx. 13.56 MHz, whereby it is particularly possible to achieve data transmission rates of more than 400 kBits per second. The communication between the payment element and the payment system can be carried out via Bluetooth or via a near field communication technique.

Additional advantages, features, and details of the invention are found in the description below, wherein multiple embodiments of the invention are described in detail with reference to the illustrations. The features indicated in the claims and in the description can be essential to the invention either alone or in any combination thereof.

DETAILED DESCRIPTION

Figure 1:
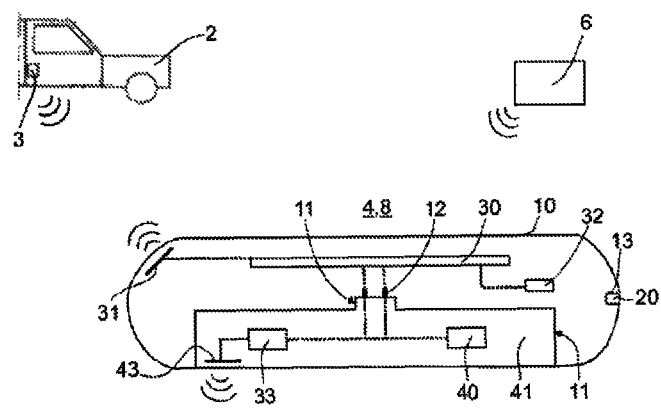
FIG. 1 shows a purely schematic illustration of a mobile identification transmitter having a payment element which is located in a receptacle of the housing of the identification transmitter.
Figure 2:
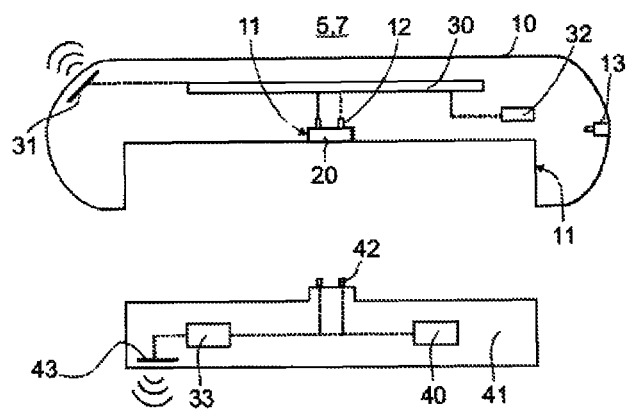
FIG. 2 shows the identification transmitter in FIG. 1, wherein the payment element is removed from the receptacle of the housing.

In FIG. 1 and FIG. 2, a mobile identification transmitter 1 is illustrated which serves to activate a security system of a motor vehicle 2. In addition, this embodiment discloses a system wherein a payment element 40 which is arranged inside the mobile identification transmitter 1 can be brought into data communication with an electronic payment system 6. In addition, the mobile identification transmitter 1 has electronics 30 which can contain stored identification data. In addition, the motor vehicle 2 has communication means 3 which can be designed as a transmitter and/or receiver unit. In addition, the mobile identification transmitter 1 has a communication means 31 which can communicate with the communication means 3 on board the motor vehicle. The security system of the motor vehicle 2 is only activated, for the purpose of carrying out an unlocking or locking process of the motor vehicle door, once a positive authentication has been determined following the communication between the communication means 3, 31. This means that the user carrying a valid identification transmitter 1 can open his motor vehicle 2, for example.

The housing 10 of the mobile identification transmitter 1 is designed with a receptacle 11 into which the payment element 40 is inserted. In the present embodiment, a carrier 41 is included, and the payment element 40 is integrated into the same. The carrier 41 is accordingly matched to the geometric shape of the receptacle 11 of the housing 10. When the carrier 41 is in the inserted state in the receptacle 11 according to FIG. 1, the carrier 41 takes on a certain housing function. In addition, the receptacle 11 can be geometrically designed in various ways to reliably hold the carrier 41 with the payment element 40 in the housing 10 of the identification transmitter 1. However, in all embodiments, the payment element 40 is inserted with the carrier 41 into the receptacle 11 in such a manner that the user can remove the payment element 40 from the receptacle 11 if needed. According to FIG. 1, it can be contemplated that the communication means 31 is likewise used for the communication with the electronic payment system 6, wherein said communication means 31 is also used for the communication with the communication means 3 on board the motor vehicle. As an alternative, it is also possible that a second communication means 43 is included in the mobile identification transmitter 1 for the communication with the electronic payment system 6. In this case, the communication means 43 can be arranged on the housing 10 of the mobile identification transmitter 1, for example. Similarly, it can be contemplated that the payment element 40 itself is designed having this communication means 43. Likewise, it can be contemplated that the carrier 41 has the communication means 43.

In a further embodiment which is not explicitly illustrated, the payment element 40 can be removably attached independently in the receptacle 11 of the housing 10. This means that the payment element 40 can be arranged on the housing 10 without a support, as according to FIG. 1 or FIG. 2. For example, a slot, a window, an opening, etc. is constructed on the housing 10 according to the geometry of the payment element 40 such that the payment element 40 is reliably accommodated. If the user removes the payment element 40 from the housing 10 at this point, a corresponding closure is additionally included and is arranged separately on the housing, in order to reliably close the receptacle of the payment element 40 once again.

The payment element 40 can have a chip, for example, including a microprocessor, circuit, storage device, etc., in order to carry out payment actions with the payment system 6. This is shown schematically in FIG. 1 and FIG. 2, for example. The payment system 6 can be positioned at a point of sale (POS), for example, wherein to ensure a cashless payment transaction between the buyer, the same carrying the mobile identification transmitter 1 for example, and a seller and/or a credit institute. In this case, the payment element 40 can have a credit card function and/or a debit card function, for example. In FIG. 1, the payment element 40 with the carrier 41 is held in the receptacle 11 of the housing 10, such that the identification transmitter 1 is in its normal state, wherein communication with the security system of the motor vehicle 2 and also communication with the payment system 6 are possible. The secure state 5 is shown in FIG. 2, wherein a closure 20 is fastened in the receptacle 11 such that components such as contact elements 12 of the receptacle 11, for example, the same being sensitive to disruption, are protected, whereby it is possible to prevent function disruptions. In this secure state 5, communication is possible between the identification transmitter 1 and the security system of the motor vehicle; however, a payment action via the payment element 40, the same being removed from the receptacle 11, is not possible.

In addition, it can be contemplated that an energy storage device 32 is included on the identification transmitter 1 in order to supply the necessary electronic components with current. FIG. 1 shows that the energy storage device 32 can be integrated into the housing 11, for example, in order to supply the electronics 30, including the communication means 3, 43, 31, with current. Likewise, it is possible that a second energy storage device 33 is included which is directly integrated into the payment element 40 or is directly integrated into the carrier 41. This second energy storage device 33 serves as a redundancy for the first energy storage device 32.

As shown is FIG. 1 and in FIG. 2, the closure 20 is inserted in a receptacle 13 of the housing 10, and according to the invention is in a passive position 8. The active position 7 of the closure 20 is shown in FIG. 2, wherein the closure 20 is fastened in the receptacle 11.

The closure 20 can be designed as a dummy plug which is designed with corresponding contact elements which can be plugged into the contact elements 12 of the housing 10, wherein this dummy plug 20 is reliably held in the receptacle 11 and constitutes a reliable seal for the receptacle 11.

Figure 3:
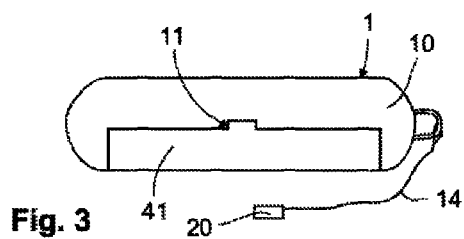
FIG. 3 shows a further variant of a mobile identification transmitter according to FIG. 1.

A further embodiment of the identification transmitter 1 according to the invention, as shown in FIG. 1 and FIG. 2, is shown in FIG. 3, wherein the closure 20 is fastened on the housing 10 via a cable 14. The cable 14 can be designed as a flexible cable, for example. The remaining embodiments of the identification transmitter 1, as in FIG. 1 and FIG. 2, refer to the identification transmitter 1 shown in FIG. 3.

Figure 4:
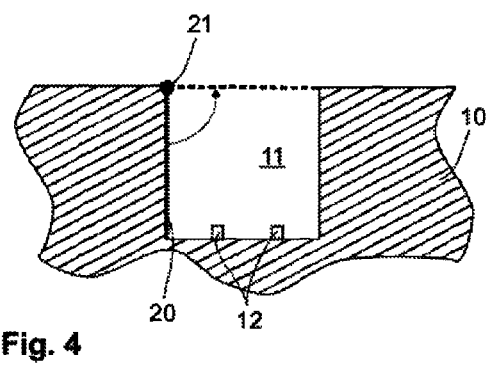
FIG. 4 shows an enlarged view of the receptacle of the housing in FIG. 1 in an additional embodiment variant.
Figure 5:
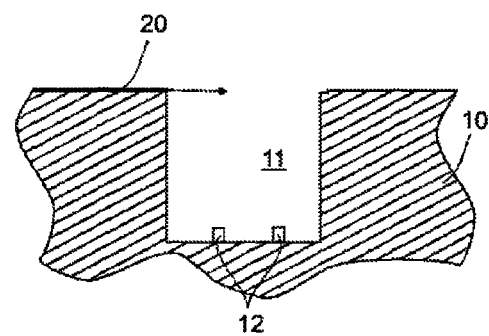
FIG. 5 shows a further embodiment of a receptacle of the housing in FIG. 1.

In FIG. 4 or FIG. 5, the receptacle 11 is shown, wherein in FIG. 4 the closure 20 is a cap which can pivot about an axis 21 and which is under spring tension when in the passive position 8. At this point, if the payment element is removed from the receptacle 11 as shown in FIG. 4, the closure 20 simultaneously pivots counter-clockwise about the axis 21, and reaches its active position 7. This is shown by the dashed line in FIG. 4. The contact elements 12 located in the receptacle 11 can therefore be effectively sealed-off and protected from the external environment.

In FIG. 5, the closure 20 can move translationally between its active position 7 and its passive position 8. At this point, if the payment element 40 is removed from the receptacle 11 of the housing 10, the closure 20 can be manually slid into the active position 7 (shown by a dashed line)—or this movement of the closure 20 into its active position 7 can be carried out automatically. This embodiment is particularly characterized by its compactness; and when the closure 20 is in the active position 7, the contact elements 12 are simultaneously sealed-off and protected in the receptacle 11.

According to all embodiments, a corresponding seal can be included on the closure 20 and/or on the carrier 41 and/or on the wall of the receptacle 11, in order to effectively seal-off the contact elements 12, 42 and also the electronics 30 with their attached electronic components. This applies both for the normal state 4 and for the secure state 5 of the identification transmitter 1. In addition, in all embodiments, the closure 20 can serve as an advertisement or information board on which information, and particularly a logo, letters, a combination of numbers, advertisement information, etc. can be applied, and particularly printed.

The invention claimed is:

1. A mobile identification transmitter for activating a security system of a motor vehicle, comprising:
    a housing in which electronics and a communication means are arranged, wherein the communication means can be brought into communication with a communication means of the security system on board the motor vehicle,
    a payment element removably fastened in a receptacle of the housing,
    a closure separately arranged on the housing,
    wherein the identification transmitter can be set in a normal state and a secure state, in the normal state and in the secure state communication can be carried out with the security system, and in the secure state, the payment element is removed from the receptacle, and the closure seals and protects the receptacle, wherein the receptacle has contact elements which the payment element contacts and is connected to in the normal state, wherein in the secure state the closure protects the contact elements from the external environment.

2. The mobile identification transmitter according to claim 1, wherein, in the normal state, the payment element can be brought into data communication with a payment system.

3. The mobile identification transmitter according to claim 2, wherein the carrier or the payment element has/have their own communication means for communication with the payment system.

4. The mobile identification transmitter according to claim 2, wherein the communication means of the identification transmitter simultaneously serve the purpose of communication with the payment system.

5. The mobile identification transmitter according to claim 1, wherein the payment element has a credit card function or a debit card function.

6. The mobile identification transmitter according to claim 1, wherein a carrier is included and the payment element is integrated in the same, wherein the carrier is removably fastened in the receptacle.

7. The mobile identification transmitter according to claim 6, wherein the second energy storage device is integrated in the carrier.

8. The mobile identification transmitter according to claim 6, wherein the carrier or the payment element has/have their own communication means for communication with the payment system.

9. The mobile identification transmitter according to claim 1, wherein the closure is movably mounted on the housing and can move between an active position and a passive position, wherein the identification transmitter is in the secure state in the active position.

10. The mobile identification transmitter according to claim 1, wherein an energy storage device is included which supplies the electronics with current.

11. The mobile identification transmitter according to claim 1, wherein an energy storage device is included which supplies the payment element with current.

12. The mobile identification transmitter according to claim 1, wherein a second energy storage device is included.

13. The mobile identification transmitter according to claim 12, wherein the second energy storage device is integrated in the carrier.

14. The mobile identification transmitter according to claim 1, wherein the closure is designed as a dummy plug.

15. The mobile identification transmitter according to claim 14, wherein the dummy plug is fastened on a cable of the housing.

16. The mobile identification transmitter according to claim 1, wherein a blocking device is included which in the normal state of the identification transmitter locks the payment element in place in the receptacle of the housing.

17. The mobile identification transmitter according to claim 1, wherein a locking device is included which in the secure state of the identification transmitter locks the closure in place in the receptacle.

18. The mobile identification transmitter according to claim 1, wherein information is arranged on the closure.

* * * * *